J. W. LEDOUX.
INTEGRATING MECHANISM.
APPLICATION FILED SEPT. 11, 1916.

1,243,843.

Patented Oct. 23, 1917.
2 SHEETS—SHEET 1.

Inventor:
J. W. Ledoux,
By C. N. Butler
Attorney.

UNITED STATES PATENT OFFICE.

JOHN W. LEDOUX, OF SWARTHMORE, PENNSYLVANIA.

INTEGRATING MECHANISM.

1,243,843.     Specification of Letters Patent.     Patented Oct. 23, 1917.

Application filed September 11, 1916. Serial No. 119,418.

*To all whom it may concern:*

Be it known that I, JOHN W. LEDOUX, a citizen of the United States, residing at Swarthmore, county of Delaware, and State of Pennsylvania, have invented Improved Integrating Mechanism, of which the following is a specification.

My invention relates to means for integrating the flow of fluids and it is designed to provide simple, convenient and accurate apparatus for indicating the rate of flow at any desired instant, the fluctuations of the flow throughout a period of time and the total flow during a period or periods.

A primary object of my invention is to obtain the foregoing results by means that will differentiate pressures of the fluid and translate the variations of the resultant into angular or rotary movement which shall be in direct ratio to the velocity or quantity of the fluid flowing.

The pressure differentiations and a rectilineal movement for producing an angular or rotary movement may be obtained variously, as by the connection of a conduit containing a Venturi tube, Pitot tubes or a weir, with a diaphragm, piston or float, which is connected with and turns an angularly movable or journaled device such as a sheave.

The movement directly resulting from this arrangement would be in direct ratio to the differential head which actuates the diaphragm, piston or float, but as the head is proportional to some exponential function of the velocity, which it is desired to indicate, it is necessary to modify the action by means that will make this angular movement directly proportional to variations in the velocity and quantity rather than the head.

A characteristic feature of my invention is the means, comprising a peculiar counter-weighted cam, for modifying the normal movement in direct ratio to variations in the head and effecting a movement in direct ratio to changes in the velocity or quantity, and indicating the velocity and the quantity, or either, at any desired instant or over any desired period.

The character of my invention will be fully understood from the following description and the accompanying drawings in illustration thereof.

Figure 1:
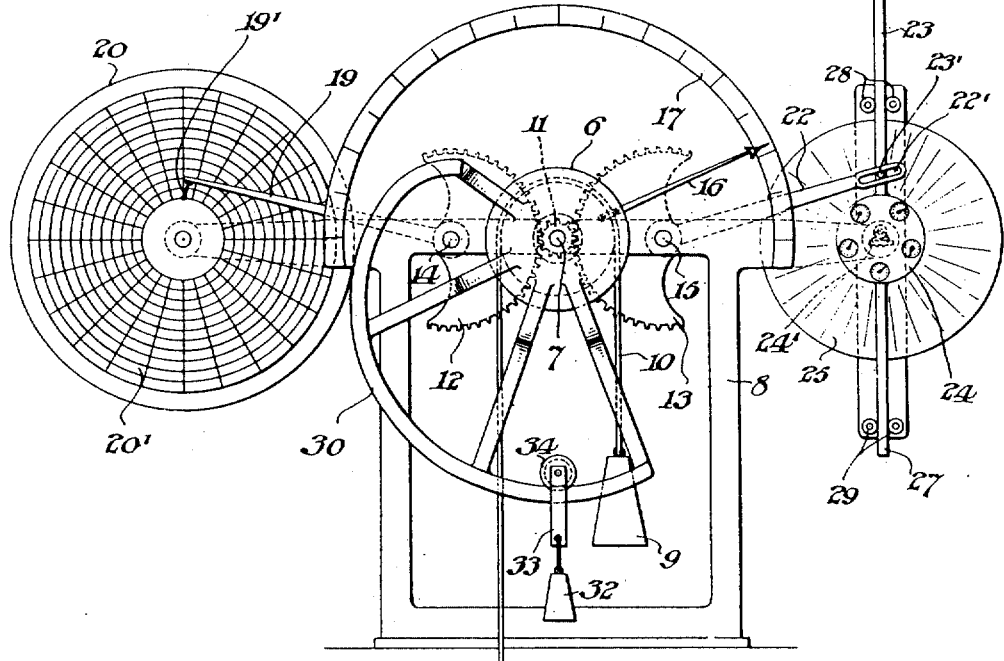
Figure 2:
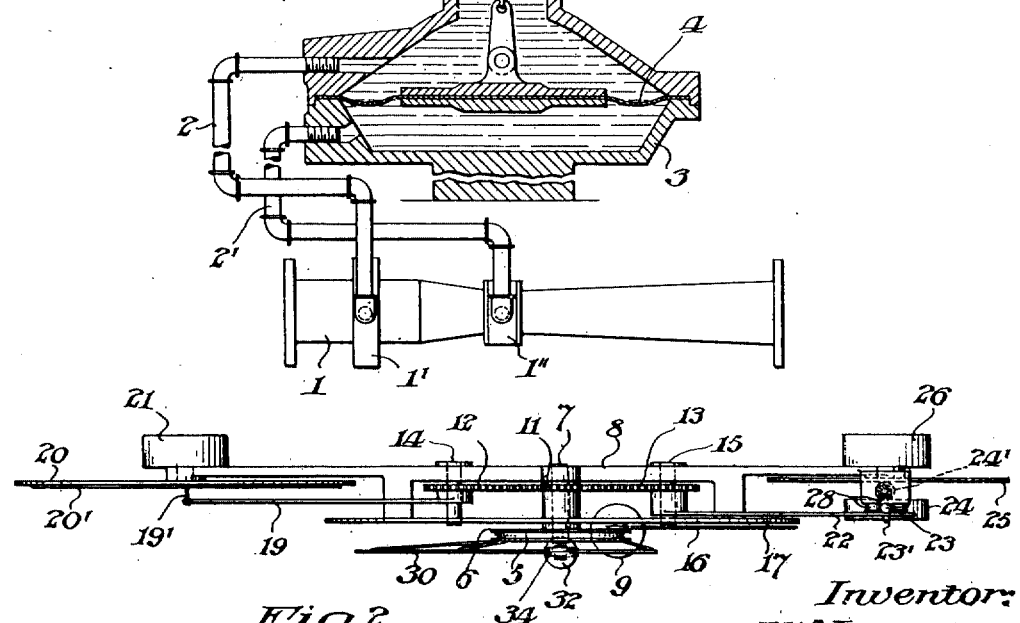
Figure 3:
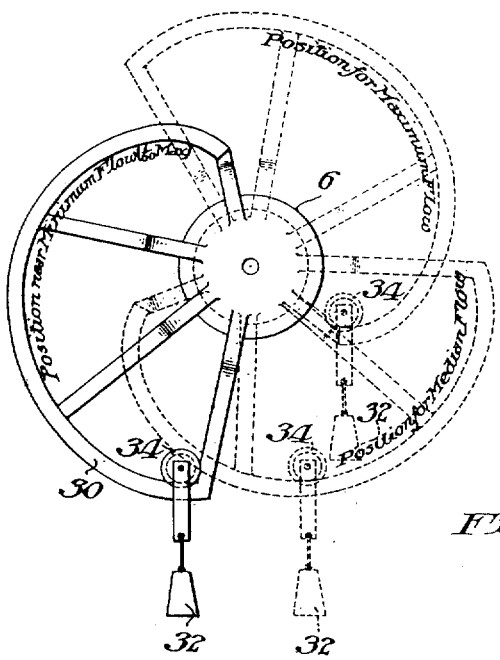
Figure 4:
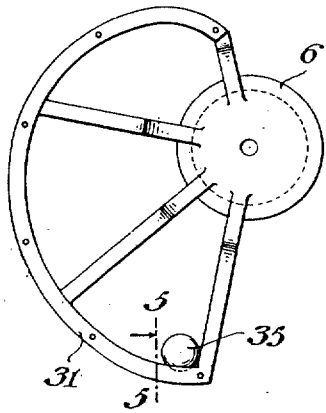
Figure 5:
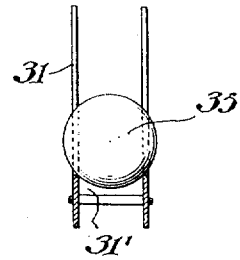

In the drawings, Figure 1 is a part sectional elevation of mechanism embodying my invention; Fig. 2 is a plan view of part of the same; Fig. 3 is a diagrammatic view representing different positions of the cam mechanism under different conditions; Fig. 4 is a side view of a detail representing a modification of the construction of the cam and weight; and Fig. 5 is an enlarged sectional view taken on the line 5—5 of Fig. 4.

In the form of the invention represented in the drawings, the conduit 1 has a section 1' connected with a tube 2 and a smaller Venturi section 1'' connected with a tube 2', the tubes being connected with the interior of a case 3 on opposite sides of a diaphragm 4 therein.

The diaphragm 4 is connected by a cord 5 with a sheave 6 mounted on a journaled shaft 7 which is carried by the frame 8, and a weight 9 is connected to the sheave by a cord 10 so as to act counter to the cord 5.

A pinion 11 is fixed on the shaft 7 and engages the gears 12 and 13 which are journaled by means of the respective arbors 14 and 15 carried by the frame 8.

The sheave 6 has a hand 16 fixed thereto and movable thereby over a dial 17, which indicates the velocity or rate of flow at any instant.

The gear 12 has fixed thereto an arm 19 provided with a marker 19' which is movable between the center and periphery of a chart 20' on a disk 20, the latter being revolved at a constant rate by a clock 21.

The gear 13 has fixed thereto an arm 22 provided with a slot 22' which engages a pin 23' on the supporting rod or hanger 23 of a counter or register 24. The counter is actuated by the contact of its driving wheel 24' with the surface of a disk 25 which is carried by the frame and driven at a constant rate by a clock 26, the driving wheel being movable between the center and periphery of the disk under control of the guiding rods 23 and 27 fixed to the register and movable between the respective guide rollers 28 and 29 journaled on the frame.

In order that the angular movement of the journaled or reciprocating parts which are operated by variations in the differential head or pressure of fluid in the conduit shall be in direct ratio to changes in the velocity or quantity of the fluid flowing in the conduit, a cam 30 or 31 is fixed to the sheave 6 and a rolling weight is carried thereby, as the poise 32 connected by the hanger 33 with a wheel 34 which runs on the cam 30 or the ball 35 which rolls in the channel 31' contained in the cam 31.

The cam is shaped, connected and weighted so that it will provide the variable force necessary to modify the action and effect an angular movement which shall bear the desired functional relation to variations in the head, or which shall be in direct ratio to the changes in the velocity or quantity of the fluid flowing, between the minimum and maximum flow.

Considering, for the purpose of illustration, the application of the invention involving the use of a Venturi tube, the formula for the head in terms of the quantity and a constant is $$H = CQ^2.$$

If X be the angular movement of the cam from an initial position; W the weight of the laterally moving counter-weight carried by the sheave; $r$ the variable lever arm of the weight W, and $a$ the constant lever arm of the weight W' and the head H (the force exerted by the diaphragm), then $$Ha - W'a = Wr$$

and, by substituting for H its value $CX^2$ and transposing, $$r = \frac{aCX^2}{W} - \frac{aW'}{W}$$

or, by substituting C' and C'' for the known quantities $$r = C'X^2 - C''.$$

The shape of the cam's curve on which the counter-weight rolls may be determined graphically by plotting assumed values of X and values of $r$ determined therefrom by substitution in the given equation. It is sufficient practically to determine and plot the values of $r$ from assumed and plotted values of X differing by 2 degrees.

The curve is plotted conveniently by drawing on tracing cloth, from a center, radial lines 2 degrees apart; drawing from a center taken on a sheet of cross-section paper a line making an angle of say 40 degrees on the left of a vertical of the cross section lines containing the center, and pivoting the center of the tracing cloth on the center of the cross-section paper.

Now place an extreme of the radial lines on the tracing cloth on the angle line of the cross-section paper such that the other radial lines will lie on the left of the registering lines; take a datum point on the registering lines, say three inches distant from the vertical passing through the center, and draw a vertical datum line on the cross-section paper through this point. Then revolve the tracing cloth anti-clockwise 2 degrees until the second radial line falls on the angle line and lay off the first value of $r$ to the right from the datum line, locating the point determined thereby slightly below the datum or zero point on the cloth. Again revolve the tracing cloth anti-clockwise 2 degrees, until the third radial line falls on the angle line and measure off to the right from the datum line the second value of $r$, locating the third point of the curve slightly below the second point, but in such relation thereto that when the second radial line is turned back to registration with the angle line the second point will be lower than the first and third.

In this manner points are plotted which locate a curve of such character that the movable weight is shifted automatically to positions such that its moments will be equal to the counteracting moments throughout the range of action. The gradient between the lowest point of the curve (which the weight automatically takes) and the adjacent higher points on either side may be 1% or less, but it is preferably 2% or 3% to overcome mechanical imperfections.

It is desirable, for the purpose of having a well proportioned instrument adapted to usual problems, that the curve over which the weight is movable should be substantially more than a quadrant, and that the traveling weight should act on opposite sides of the cam's center of revolution at the minimum and maximum flows, for which reason the 40 degree angle line and the datum line are assumed and located. But it will be understood that variations in conditions will render changes in proportion desirable.

The cam for a V-notch weir plotted from a 16 degree angle line has the approximate form and takes the positions in operation indicated in Fig. 3, the full line construction illustrating the approximate position for the minimum flow, the opposite broken line construction illustrating the position for the maximum flow, and the intermediate broken line construction illustrating the position for the median flow.

The maximum angular movement found desirable by my operations is approximately 240 degrees and the angular movement of the weight is generally within 130 degrees.

Having described my invention, I claim:

1. In an integrating mechanism, means movable by varying pressures and controlling means connected therewith, said controlling means comprising a cam having a track and a traveling weight supported by and movable on said track, whereby the angular movement of said cam varies directly with an exponential function of said pressure.

2. In an integrating mechanism, means movable by varying pressure, in combination with counter-acting means comprising a revoluble device having an interior cam surface and a weight adapted to roll thereon, whereby the angular movement of said device varies directly with an exponential function of said pressure.

3. In an integrating mechanism, means movable by varying pressure, in combination with counteracting means comprising an oscillatory cam and a traveling weight supported by said cam, said weight being movable by said cam under the influence of said pressure to opposite sides of a vertical passing through the axis of said cam.

4. In an integrating mechanism, means comprising a fluid conduit and a device movable by variations of pressure of fluid flowing in said conduit, in combination with means comprising a journaled cam and a rolling weight supported by said cam, whereby the angular movement of said cam is in direct ratio to changes in the flow in said conduit.

5. In an integrating mechanism, means comprising a fluid conduit and a device movable by variations of pressure of fluid flowing in said conduit, in combination with means comprising a journaled device having an interior cam surface, a rolling weight movable over said surface across the vertical through the axis of said cam, and indicating means operated at a rate proportional to the angular movement of said cam.

6. In an integrating mechanism, means comprising a fluid conduit and a device movable by the pressure of fluid in said conduit, in combination with means comprising a journaled device having a cam surface and a weight movable by said cam surface through an angle of more than 90 degrees.

7. In an integrating mechanism, means comprising a fluid conduit and a device movable by the pressure of fluid in said conduit, in combination with means comprising a journaled cam having a maximum angular movement of approximately 240 degrees and a weight adapted to roll on said cam.

In testimony whereof I have hereunto set my name this 5th day of September, 1916.

JOHN W. LEDOUX.

Copies of this patent may be obtained for five cents each, by addressing the "Commissioner of Patents, Washington, D. C."